June 15, 1937.  B. F. W. HEYER  2,084,086
BATTERY TESTING APPARATUS
Filed Aug. 9, 1934  3 Sheets-Sheet 1
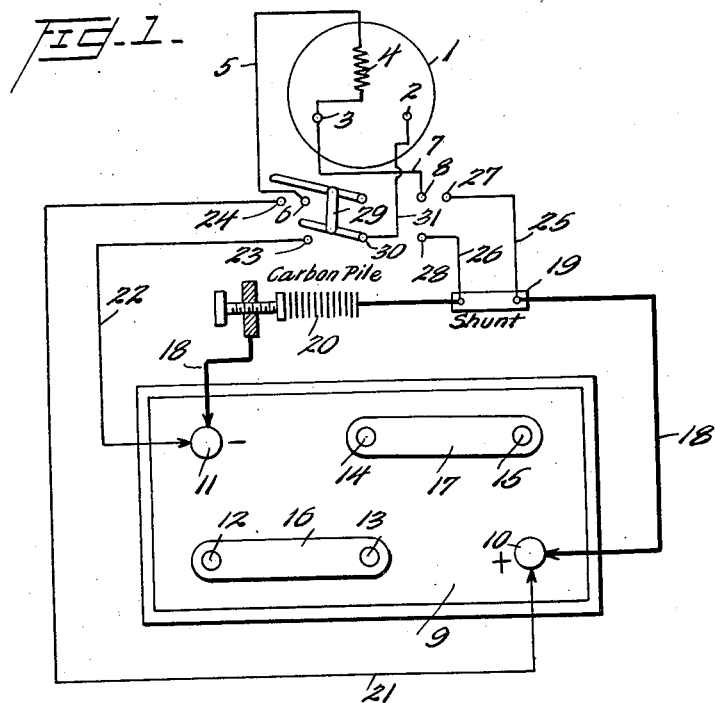
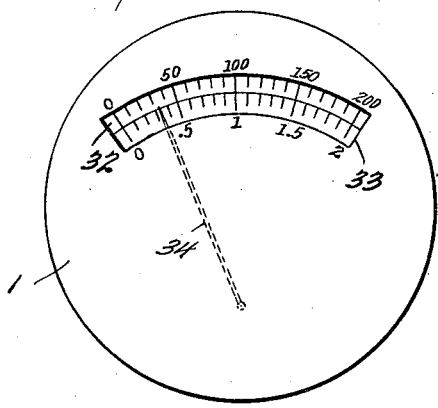
Inventor
Benjamin F. W. Heyer
By Semmes & Semmes
Attorneys

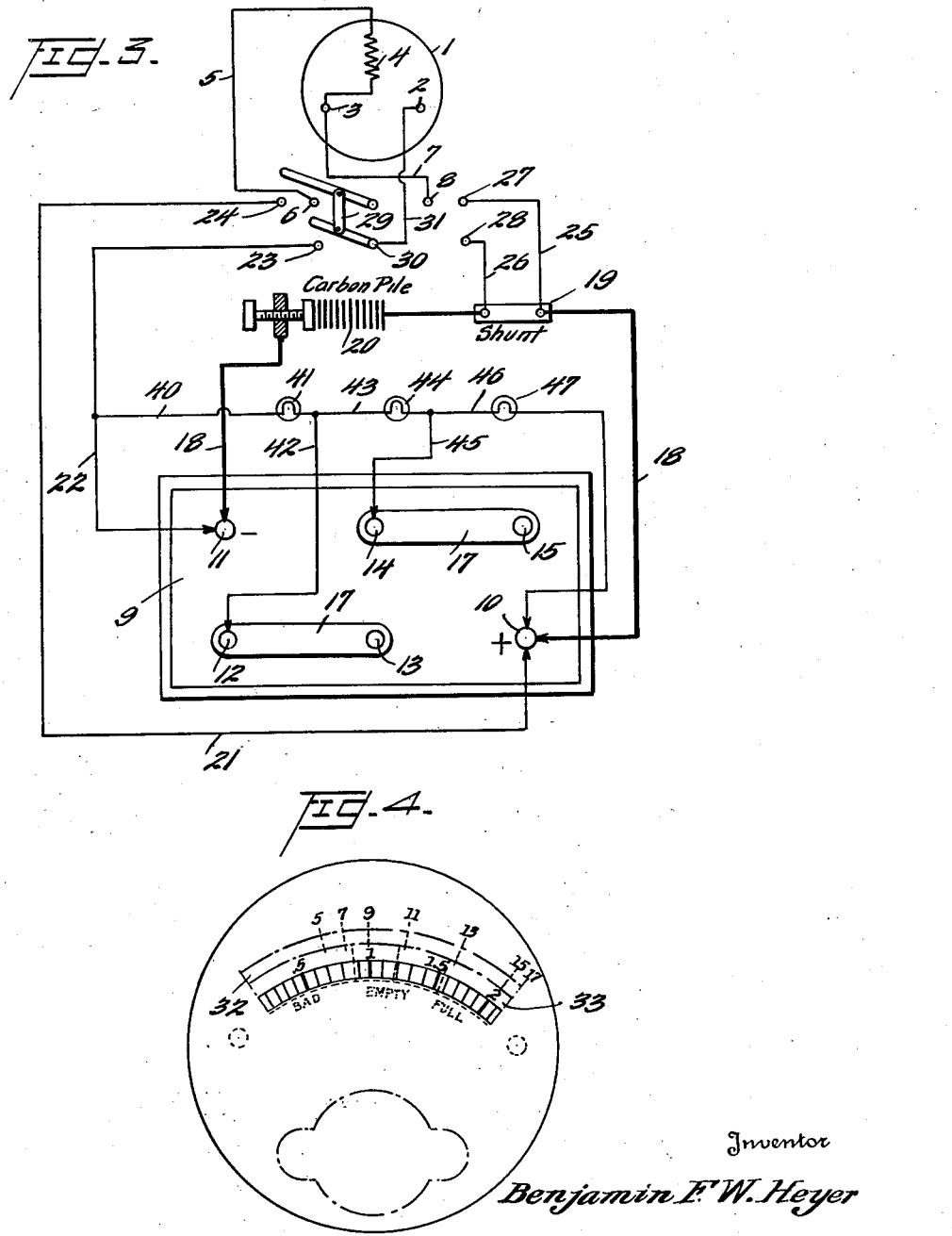

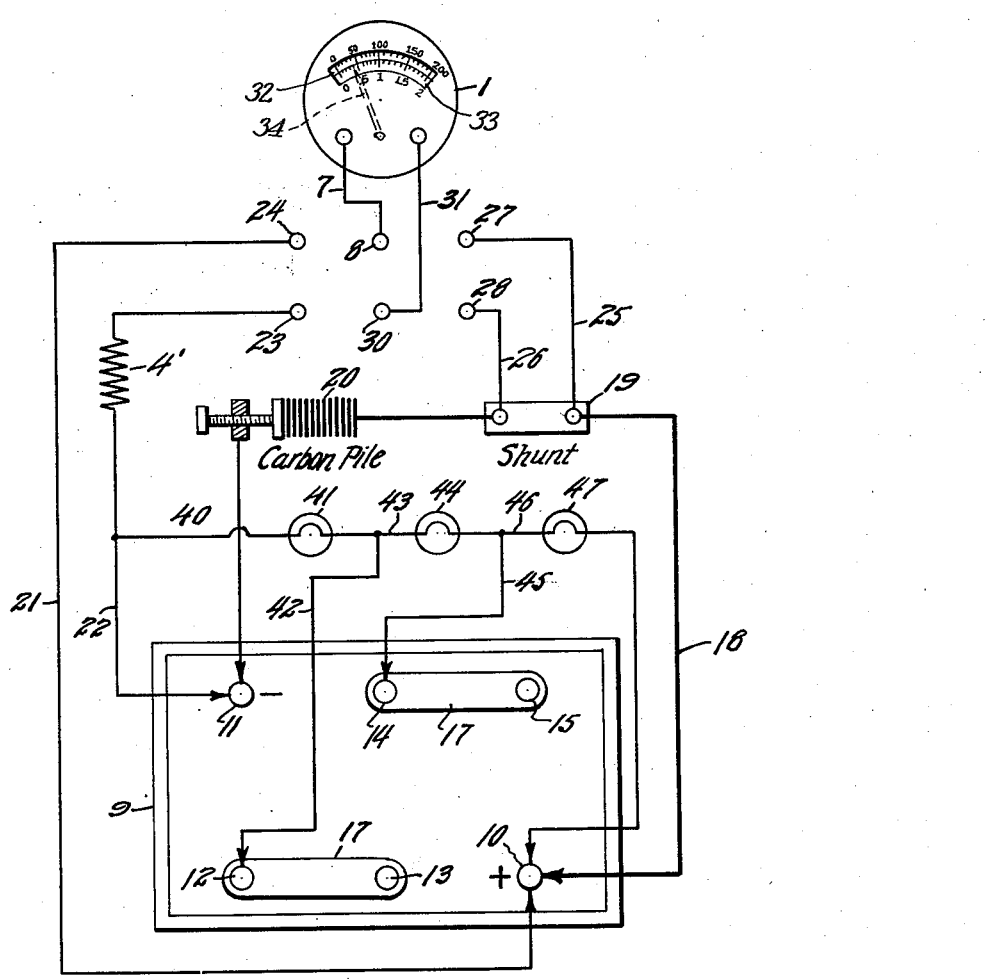

Patented June 15, 1937

2,084,086

UNITED STATES PATENT OFFICE 2,084,086

BATTERY TESTING APPARATUS

Benjamin F. W. Heyer, Belleville, N. J.

Application August 9, 1934, Serial No. 739,162

9 Claims. (Cl. 175—183)

My invention relates to an apparatus for testing batteries, and is particularly designed to enable the condition of the batteries to be accurately tested.

An object of my invention is to provide a test mechanism for batteries employing a combined voltmeter-ammeter indicating mechanism in which the errors in recording voltages are minimized.

A further object of my invention is to provide in such a system means for indicating comparatively the conditions of the cells of a battery.

With these and other objects in view, which may be incident to my improvements, the invention consists in the parts and combinations to be hereinafter set forth and claimed, with the understanding that the several necessary elements comprising my invention may be varied in construction, proportion and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a schematic view showing my apparatus applied to a storage battery;

Fig. 2 is an enlarged diagrammatic view of the face of the indicating instrument;

Fig. 3 is a view similar to Figure 1, of a modified arrangement which indicates the comparative condition of the cells of the battery;

Fig. 4 is a view of a modified dial face for a combined voltmeter-ammeter testing instrument;

Fig. 5 is a schematic view of a modified circuit arrangement.

Referring to the drawings, in Figure 1, I have shown a combined voltmeter-ammeter testing instrument, which I have indicated by the numeral 1. Within the instrument are terminals 2 and 3, across which terminals are connected the indicating mechanism of the instrument, which is of conventional form, and need not be shown. In circuit with the terminal 3 is a multiplier resistance 4 to be used in circuit when the instrument is used as a voltmeter. The details of such instruments are well known in the art, and need not be described. In circuit with the multiplier resistance 4 is a lead 5 and a terminal 6. In circuit with the terminal 3 is a lead 7 and a terminal 8.

I have diagrammatically shown the top of a battery 9 having a terminal 10 and a terminal 11. The battery is a three cell battery, and has a terminal 12 and a terminal 13, a terminal 14 and a terminal 15. As is customary in battery constructions, the terminals 12 and 13 are joined by a connector plate 16 and the terminals 14 and 15 are joined by a connector plate 17. This is a three cell battery, the terminals 11 and 12 being those of the first cell, the terminals 14 and 13 being those of the second cell, and the terminals 10 and 15 being those of the third cell.

I have diagrammatically illustrated leads to the terminals 10 and 11, which may be made by suitable clip apparatus (not shown), which is adapted to be attached to the terminals 10 and 11. One of the leads is a heavy lead adapted to carry battery current. This is lead 18. In the lead 18 is connected a shunt 19 and a carbon pile 20 to adjust the discharge rate of the battery. The lead 18 at its ends is connected to battery posts 10 and 11. Connected to the battery post 10 is a lead 21 which carries the voltage current to the combined voltmeter-ammeter 1. Another lead 22 which carries the voltage current to the voltmeter-ammeter, and which is attached to the terminal 11, is provided.

The lead 22 terminates in a terminal 23, and the lead 21 has a contact terminal 24. Across the shunt 19 are connected shunt leads 25 and 26 terminating in contact terminals 27 and 28, respectively.

I have shown a double throw switch diagrammatically at 29, which is adapted in one position to close the circuit between terminals 24 and 6, and terminal 23 and a terminal 30 in electrical connection with a lead 31 which connects with the terminal 2 of the combined voltmeter and ammeter 1. In the other position of the switch (not shown), electrical connection is made between terminals 30 and 28, and 8 and 27.

The face of the instrument 1 is provided with an ammeter scale 32 and a voltmeter scale 33. In Figure 2, I have indicated in dotted lines a pointer 34 which can move across the scales and give volt reading or a current reading, depending upon the connections which the switch 29 has set up.

Let us assume that the switch 29 is in position to close the circuit between contacts 8 and 27, and 30 and 28. Current is flowing from the positive side of the battery from terminal 10 through lead 18 over to the negative terminal 11. By adjustment of the carbon pile 20 the discharge rate of the battery can be regulated. The shunt circuit, by its leads 25 and 26, carries current to the terminals 2 and 3 of the instrument, and I obtain an ampere reading which, as before stated, can be adjusted by the setting of the carbon pile 20.

The switch 29 may then be closed to make circuit between contacts 24 and 26 and 30 and 23, in which case the voltage current flows through the lead 21, the lead 5, voltage multiplier resistance 4, to terminal 3, in the instrument across from terminal 3 to terminal 2, giving the voltage indication on the instrument, down through lead 31 and back through lead 22 to the negative terminal 11.

It is to be noted that the circuits which give the ammeter reading and the voltage reading are separate. Thus, no part of the heavy lead 18 is used to complete the circuit through the voltage indicating mechanism. This feature is of great importance, as the currents from a storage battery are apt to be as high for instance as two hundred amperes, and because of the relationship between voltage, current, and resistance, a very small resistance in the circuit carrying this heavy current will give a large error in the voltage reading of the battery.

By separating the circuits and their leads that supply the current for the ammeter reading from the circuits which supply the current for the voltmeter reading, I eliminate this error which in commercial instruments is sometimes so high as to render the constructions practically useless.

It is customary to set the discharge rate of the battery by adjusting the carbon pile for the proper discharge rate for a battery of the size under test, then to shift the switch 29 to obtain the voltage reading to find the condition of the cell. An error of two-tenths of a volt is ordinarily beyond the commercial limits, and such an error can easily creep in where the voltmeter and ammeter circuits are not separated as shown in the drawings, and just described.

Referring to Figure 3, the circuits are just the same as those described, except I have connected to the lead 22 a lead 40 in which I have an indicator light 41. The lead 40 is connected to a lead 42 which runs to the terminal 12 of the first cell. Attached to the lead 40 is a lead 43 in which is an indicator light 44. The lead 43 is connected to a lead 45 which makes connection with the terminal 14 of the middle cell of the battery. Likewise connected to the lead 43 is a lead 46 in which is an indicator light 47. The lead 46 connects to the terminal 10 of the last cell of the battery.

With the connections as shown, the indicator lights 41, 44 and 47 will give a comparative indication of the conditions of the three cells of the battery, by the intensity of the lights. These lights can be compared and the relative strength of the battery cells will thus be visible.

I have shown a scale for the combined voltmeter-ammeter which is of particular use in testing batteries. This is shown in Figure 4. Here the ammeter scale 32 shows the numerals 5, 7, 9, 11, 13, 15 and 17, which indicates the discharge rate for a battery of a certain definite number of plates. The carbon pile is set so that the battery will discharge at the proper discharge rate for a battery of the size of that under test. The combined voltmeter-ammeter instrument is then shifted to the voltmeter side and a reading is taken of the indication on the voltmeter scale 33. Under the voltmeter scale it will be noted that I have the words "bad", "empty" and "full". If upon setting of the discharge rate for a battery of the size under test the voltmeter reading is over in the section near the indication "bad", then the battery under test is indicated as being in bad condition. Likewise, an indication near the word "empty" on the voltmeter scale will indicate that the battery is not charged properly, and the word "full" will indicate that the battery is properly charged. I can use this scale marking of course in combination with either the system shown in Figure 1 or the system shown in Figure 3.

I have shown yet another circuit arrangement in Figure 5. It is obvious that the meter scale markings can be used as shown in either Figure 4 or Figure 2 with this arrangement.

In the form of circuit shown in Figure 5, I have used the same circuit arrangement as shown in Figure 3, with the exception that I have moved the multiplier resistance 4, which must be in circuit when the combined instrument is operating as a voltmeter, from a position within the case of the instrument to a position within one of the leads carrying the voltage current. In the drawings Figure 5, I have shown the multiplier resistance 4 lying between the switch and the battery terminal 11 in the lead 22. This arrangement allows some simplification of the switching mechanism. I have a simple double throw switch (not shown) which is adapted to close contacts between terminals 8 and 24 and 30 and 23, or if the instrument is used as an ammeter, to close contacts 8 and 27 and 30 and 28.

The location of the multiplier resistance in the circuit between the battery and switch in some conditions of operation eliminates danger of short circuiting, and has other advantages over the type of circuit in which the multiplier resistance is in the instrument casing.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:
1. A battery testing apparatus comprising a battery, terminals for the cells of the battery, a combined voltmeter and ammeter instrument, a circuit having leads to terminals to carry current for obtaining an ammeter reading, a separate circuit having separate leads to terminals for carrying current to obtain a voltmeter reading, switch means to close the circuit through either the first or second mentioned leads, a cell tester circuit across the terminals for a single cell, and indicating means in said cell tester circuit to indicate the condition of that cell only.

2. A battery testing apparatus comprising a battery, terminals for the cells of the battery, a combined voltmeter and ammeter instrument, a circuit having leads to terminals to carry current for obtaining an ammeter reading, a separate circuit having separate leads to terminals for carrying current to obtain a voltmeter reading, switch means to close the circuit through either the first or second mentioned leads, cell tester circuits across the terminals of each cell, and indicating means in each cell tester circuit each responsive to the condition of only a single cell to indicate the comparative condition of the cells.

3. A battery testing apparatus comprising a battery, terminals for the cells of the battery, a combined voltmeter and ammeter instrument, a circuit having leads to terminals to carry current for obtaining an ammeter reading, a shunt circuit from said first mentioned circuit for the ammeter reading, means in the first mentioned circuit to regulate the discharge rate of the battery, a separate circuit having separate leads to terminals for carrying current to obtain a voltmeter reading, switch means for closing the circuit through either the first or second mentioned leads, a cell tester circuit across the terminals for a single cell, and indicating means in said cell tester circuit to indicate the condition of that cell only.

4. A battery testing apparatus comprising a battery, terminals for the cells of the battery, a combined voltmeter and ammeter instrument, a circuit having leads to terminals to carry current for obtaining an ammeter reading, a shunt circuit from said first mentioned circuit for the ammeter reading, means in the first mentioned circuit to regulate the discharge rate of the battery, a separate circuit having separate leads to terminals for carrying current to obtain a voltmeter reading, switch means for closing the circuit through either the first or second mentioned leads, cell tester circuits across the terminals of each cell, and indicating means in each cell tester circuit each responsive to the condition of a single cell only to indicate the comparative condition of the cells.

5. In a battery testing apparatus, a battery, terminals for the cells of the battery, a combined voltmeter and ammeter instrument comprising a multiplier resistance in circuit only when the instrument is used as a voltmeter, a circuit having leads to terminals to carry current for obtaining an ammeter reading, a separate circuit having separate leads to terminals for carrying current to obtain a voltmeter reading with the multiplier resistance in circuit, switch means to close the circuit through either the first or second mentioned leads, a cell tester circuit across the terminals for a single cell, and indicating means in said cell tester circuit to indicate the condition of that cell only.

6. In a battery testing apparatus, a battery, terminals for the cells of the battery, a combined voltmeter and ammeter instrument comprising a multiplier resistance in circuit only when the instrument is used as a voltmeter, a circuit having leads to terminals for carrying current to obtain an ammeter reading, a shunt circuit for said leads for the ammeter reading, means in the first leads to regulate the discharge rate of the battery, a separate circuit having separate leads to terminals for carrying current to obtain a voltmeter reading with the multiplier resistance in circuit, switch means to close the circuit through either the first or second mentioned leads, cell tester circuits across the terminals of each cell, and indicating means in each cell tester circuit each responsive to the condition of a single cell only to indicate the comparative condition of the cells.

7. A battery testing apparatus comprising a battery, terminals therefor, a combined voltmeter and ammeter instrument, indicia on the face of the single instrument showing without further reference the proper discharge rate for the battery under test and the condition of the battery when discharging at that rate, a circuit having leads to terminals for carrying current to obtain an ammeter reading, a separate circuit having separate leads to terminals for carrying current for the voltmeter reading, switch means to close the circuit through either the first or second mentioned leads, and separate means for simultaneously indicating the comparative condition of each cell of the battery.

8. A battery testing apparatus comprising a battery, terminals therefor, a combined voltmeter and ammeter instrument, indicia on the face of the single instrument showing without further reference the proper discharge rate indicated in the number of cells on the meter face, and the condition of the battery when discharging at that rate indicated by written matter on the meter face descriptive of such condition, a circuit having leads to terminals for carrying current to obtain an ammeter reading, a separate circuit having separate leads to terminals for carrying current for the voltmeter reading, switch means to close the circuit through either the first or second-mentioned leads, and separate means indicating the comparative condition of each cell of the battery.

9. A method of testing a battery comprising causing the battery current from terminals to flow through the current indicating mechanism of a combined voltmeter-ammeter while adjusting the rate of discharge to be proper for a battery of the size under test, then causing voltages from the same terminals to be indicated on the voltage indicating mechanism of the meter while insuring that the circuits which carry the current and the voltage are entirely and electrically separate, whereby the true condition of the battery is indicated, and simultaneously indicating the comparative condition of each cell of the battery.

BENJAMIN F. W. HEYER.